May 17, 1949. H. B. CARBON 2,470,470
VALVE OPERATING MECHANISM
Filed April 10, 1945 2 Sheets-Sheet 1
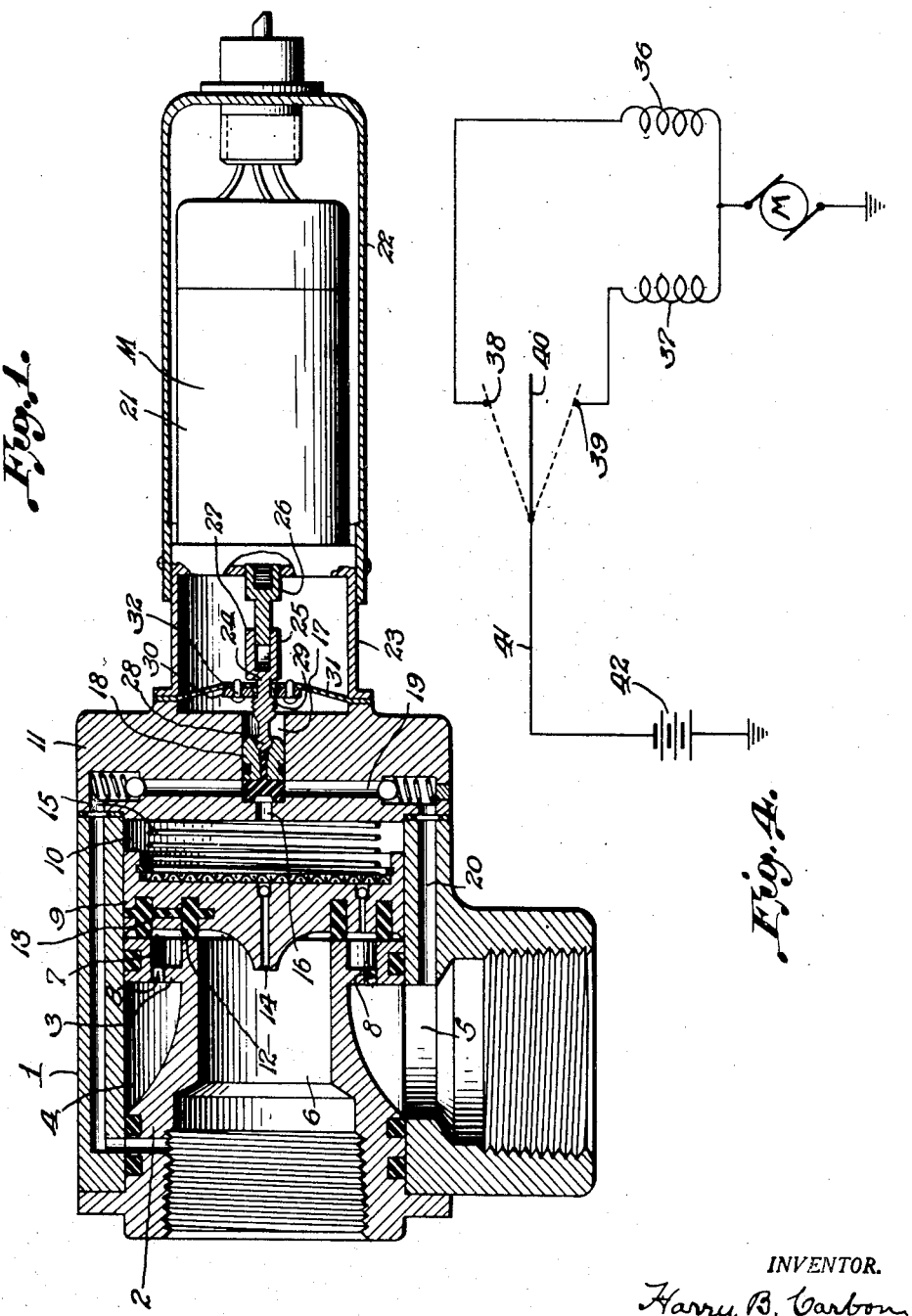
INVENTOR.
Harry B. Carbon
BY Mason, Porter & Diller
ATTORNEYS.

May 17, 1949.
H. B. CARBON
2,470,470
VALVE OPERATING MECHANISM
Filed April 10, 1945
2 Sheets-Sheet 2
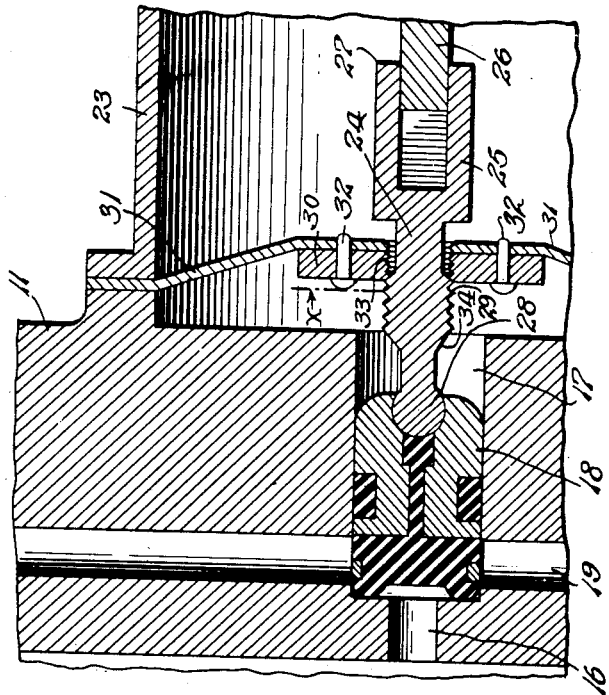
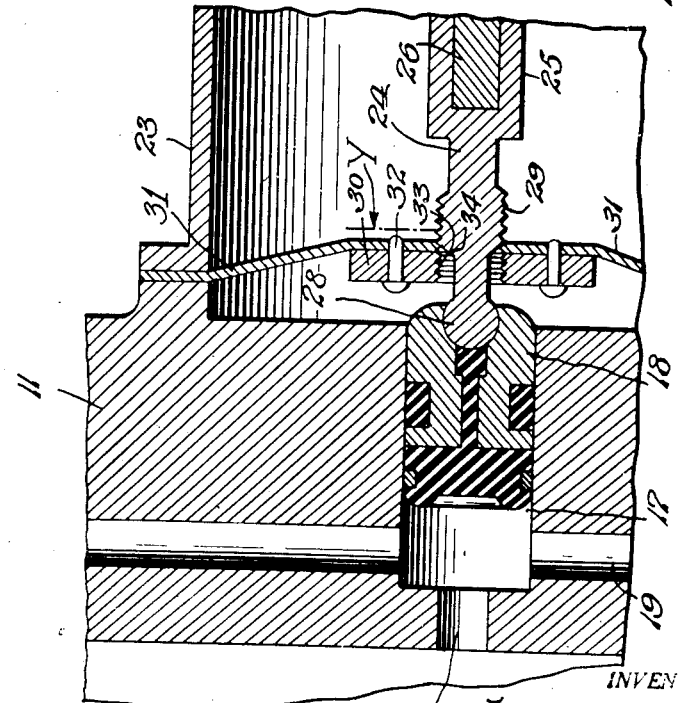
INVENTOR.
Harry B. Carbon
BY Mason, Porter & Diller
ATTORNEYS.

Patented May 17, 1949

2,470,470

UNITED STATES PATENT OFFICE 2,470,470

VALVE OPERATING MECHANISM

Harry B. Carbon, Cleveland, Ohio, assignor to The Parker Appliance Company, Cleveland, Ohio, a corporation of Ohio Application April 10, 1945, Serial No. 587,582

3 Claims. (Cl. 137—139)

The invention relates to new and useful improvements in an operating mechanism for moving a valve to open or closed position at will.

An object of the invention is to provide a mechanism for moving the valve into engagement with its seat, which mechanism is so constructed that the valve is yieldingly held pressed against the seat when closed.

A further object of the invention is to provide a mechanism of the above type wherein the valve is moved toward and from its seat by a reversible motor.

A still further object of the invention is to provide a valve operating mechanism of the above type which includes a threaded member and a nut so dimensioned that the nut leaves the thread when the valve is seated to permit the motor shaft to continue rotating free from load.

A still further object of the invention is to provide a valve operating mechanism of the above type wherein the nut is mounted on a flexible diaphragm operating through the nut to yieldingly hold the valve at the extremes of its reciprocation.

In the drawings—

Figure 1 is a sectional view through a valve assembly with the improved operating mechanism applied thereto;

Figure 2 is an enlarged sectional view of the valve and the means for reciprocating the same, the valve being shown in its seated position;

Figure 3 is a view similar to Figure 2 but showing the valve as moved away from its seat;

Figure 4 is a diagrammatic view showing the circuits for the motor and the switch controlling the same.

The invention as shown in the drawings is utilized for operating a pilot valve associated with a valve assembly wherein the valve is moved toward and from closed position by the fluid pressure on the line. While the fluid pressure operated valve mechanism per se is no part of the present invention, it will be briefly described in order that a better understanding be had of the operating means for the pilot valve associated therewith.

The valve mechanism includes a casing 1 in which is mounted an adaptor 2 having a sealed contact with the casing. The adaptor extends a short distance into the valve casing and has an annular member 3 also having a sealed contact with the casing. The adaptor is cut away to provide a chamber 4 which surrounds the adaptor and which is connected to an outlet 5. The adaptor has a central passage 6 therethrough which is connected to the inlet. The inner end of the adaptor is provided with a channel 7, and radial ports 8 connect the channel with the chamber 4 and thus the inlet through these radial ports is connected to the outlet.

The flow of the fluid from the inlet to the outlet is controlled by a valve 9 mounted in a chamber 10 formed in the valve casing between the inner end of the adaptor and the closure head 11 for the casing. The valve is free to reciprocate in this chamber. The valve is provided with a gasket having a portion 12 which engages an annular seat at the inner side of the channel 7 and a portion 13 which engages the end of the seat at the outer side of the channel 7.

There is an opening 14 through the valve. A spring 15 normally urges the valve toward its seat. A passage 16 connects the main valve chamber 10 with a pilot valve chamber 17 in which a pilot valve 18 is mounted for reciprocation. The pilot valve chamber is connected by the passages 19 and 20 with the outlet side of the valve. Fluid from the inlet side of the valve will pass through the passage 14 into the main valve chamber 10. If the pilot valve is seated, the pressure on both sides of the valve will be balanced and the spring will move the valve to closed position. When the pilot valve is open, the chamber 10 is connected to the outlet and fluid will pass through the passages 19 and 20 more rapidly than it will build up through the passage 14 which is smaller, and this will result in the movement of the valve to open position. This fluid pressure operated valve mechanism illustrated in detail in the drawings is shown, described and claimed in my copending application Serial No. 587,088, filed April 7, 1945.

The present invention has to do with the means for reciprocating the pilot valve 18 so that it is moved toward and from its seat. The pilot valve is moved toward and from seated position by a reversible motor 21 mounted in a housing 22. The housing 22 is secured to a casing 23 which in turn is secured to the closure head 11 of the valve assembly. Disposed in this casing 23 is a short shaft 24. This short shaft 24 has an enlarged head 25 provided with a recess which is square in cross section. The motor shaft has an extension 27 which is likewise square in cross section and fitted into the recess in the shaft head 25. This connection between the shaft and the motor will cause the shaft to be rotated when the motor is in operation and it will also permit the shaft to move endwise without breaking its connection with the motor shaft.

The shaft 24 at its other end is provided with a ball 28 which is disposed in a socket in the pilot valve so that the shaft is rotatably attached to the pilot valve through a connection which permits the valve to be moved without any binding action. The shaft 24 intermediate its ends is provided with a threaded section 29. A nut 30 is fixed to a flexible diaphragm 31, which diaphragm is mounted between the casing 23 and the closure head 11. The bolts which secure the casing to the closure head pass through this diaphragm and the diaphragm is firmly clamped to these parts. The nut is fixed to the diaphragm by a plurality of rivets 32. The diaphragm and nut are provided with threads 33 which are adapted to cooperate with the threads 29.

When the parts are in the position shown in Figure 2, the pilot valve is in full open position, and when the parts are in the position shown in Figure 3, the pilot valve is closed. Let us assume that the pilot valve is closed and it is desired to open the same. The motor is set into operation so that it will rotate in a counter-clockwise direction. The nut is yieldingly pressed against the threads 29 and as soon as these threads begin to turn in a counter-clockwise direction, the threads on the shaft will engage the threads on the diaphragm and the shaft 24 will be moved endwise to the right to the position shown in Figure 2. When in this position shown in Figure 2, the parts are preferably dimensioned so that the end of the motor shaft will engage the bottom of the recess in the threaded shaft 24.

As noted above, the diaphragm 31 is flexible and the parts are dimensioned so that when the threaded shaft 24 reaches the position shown in Figure 2, the threads are disengaged and the diaphragm is yieldingly pressed against the beveled surface 34. This yielding pressure of the diaphragm against the threads will aid in the engagement of the threads when the shaft 24 is turned in a clockwise direction for seating the valve. It is also noted that when the valve is fully seated, the nut will be disengaged from the threads 29. The diaphragm will be flexed to the right and the tendency of the diaphragm to return to its normal position will press the nut against the inclined face 35 of the threads on the shaft. This will exert a yielding pressure of the valve against its seat. It will also greatly aid in the threads being interengaged when the shaft is turned in a counter-clockwise direction for unseating the valve. The extent to which the diaphragm has been flexed when the valve is in closed position and when the valve is in open position is indicated by a dash and dot line marked "X" and "Y" respectively.

From the above it will be noted that the valve is moved to and from seated position by the positive engagement of the threads on the shaft with the threads on the nut and at the same time when the valve is seated, it will be held seated by the yielding pressure on the flexible disk.

As noted above, the motor is an ordinary reversing motor. In Figure 4 there is shown diagrammatically the wiring of the motor and a switch for controlling the same. The motor indicated at M has two fields 36 and 37. The field 36 is connected to a terminal 38 and the field 37 is connected to a terminal 39. A switch arm 40 is connected through a line 41 to a battery 42. When this switch arm is thrown so as to engage the terminal 38, the coil 36 will be energized and the motor will be caused to rotate in one direction. When the switch arm 40 is thrown so as to engage the terminal 39, the coil 37 will be energized and the motor will turn in the opposite direction.

When it is desired to close the valve, the switch arm is thrown so as to cause the motor shaft to rotate in a clockwise direction and this will cause the threads 29 to pass through the nut 30 to the position shown in Figure 3. In this position the threads are disengaged and the motor can continue to rotate in a clockwise direction, free from load. It is only necessary to momentarily actuate the hand switch as it only requires a few revolutions of the shaft to effect the complete opening or closing of the valve, but if the switch is held in an "on" position longer than necessary, the motor runs free and is practically under no load.

Furthermore, it will be noted that the motor when it has moved the valve to closed position, is free to coast to a stop. When the valve is moved to closed position and yieldingly pressed against the seat, it will make a very tight seating of the valve and any wear in the parts is taken up by this yielding pressure of the valve against its seat.

While the valve operating mechanism has been described in detail in connection with a pilot valve associated with a fluid pressure operated valve, it will be understood that this valve operating mechanism may be used in connection with any reciprocating valve and, in fact, is capable of use in connection with any reciprocating part which is movable from one set position to another.

It is obvious that many changes in the details of construction and the arrangement of the parts may be made without departing from the spirit of the invention as set forth in the appended claims.

I claim:

1. In a valve assembly a casing, a valve seat, a valve, a valve actuating means for moving the valve to and from its seat, said actuating means including a shaft rotatably connected to the valve, said shaft having a threaded section, a nut having a thread cooperating with the thread on the shaft, a flexible disk for supporting said nut, said threaded section being dimensioned so that when the valve is seated the nut will pass off from the threaded section on the shaft and flex the disk supporting the same said disc when flexed operating to hold said nut pressed against the threaded section for insuring engagement of the nut with the threaded section when the shaft is rotated in a reverse direction, and a reversible motor for rotating said shaft, said shaft being connected to said motor so that the shaft may move endwise with the valve toward and from its closed position.

2. In a valve assembly a casing, a valve seat, a valve, a valve actuating means for moving the valve to and from its seat, said actuating means including a shaft rotatably connected to the valve, said shaft having a threaded section, a nut having a thread cooperating with the thread on the shaft, a flexible disk for supporting said nut, said threaded section being dimensioned so that when the valve is seated the nut will pass off from the threaded section on the shaft and flex the disk supporting the same said disc when flexed operating to hold the nut pressed against the threaded section for insuring engagement of the nut with the threaded section when the shaft is rotated in a reverse direction.

3. In a valve assembly, a casing, a valve seat, a valve, a valve actuating means for moving the valve to and from its seat, said actuating means including a shaft rotatably connected to the valve, said shaft having a threaded section, a nut having a thread cooperating with the thread on the shaft, yieldable means for supporting said nut, said threaded section being dimensioned so that when the valve is seated the nut will pass off of the threaded section on the shaft and move the yieldable means supporting the nut, said yieldable means operating to hold the nut pressed against the end of the threaded section for insuring engagement of the nut with the threaded section when the shaft is rotated in a reverse direction.

HARRY B. CARBON.

REFERENCES CITED

The following references are of record in the file of this patent:

UNITED STATES PATENTS

| Number | Name | Date |
|---|---|---|
| 622,912 | Corey | Apr. 11, 1899 |
| 961,738 | Stickel | June 14, 1910 |
| 1,586,393 | Astrom | May 25, 1926 |